(12) United States Patent
Prabhu et al.

(10) Patent No.: US 9,385,527 B2
(45) Date of Patent: Jul. 5, 2016

(54) ENHANCED CHARGE DEVICE MODEL CLAMP

(71) Applicant: GLOBALFOUNDRIES Inc., Grand Cayman (KY)

(72) Inventors: Manjunatha Govinda Prabhu, Malta, NY (US); Mahadeva Iyer Natarajan, Clifton Park, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/682,910

(22) Filed: Apr. 9, 2015

(65) Prior Publication Data

US 2015/0214733 A1    Jul. 30, 2015

Related U.S. Application Data

(63) Continuation of application No. 13/910,386, filed on Jun. 5, 2013, now Pat. No. 9,030,791.

(51) Int. Cl.
| | |
|---|---|
| *H01C 7/12* | (2006.01) |
| *H02H 1/00* | (2006.01) |
| *H02H 1/04* | (2006.01) |
| *H02H 3/22* | (2006.01) |
| *H02H 9/04* | (2006.01) |

(52) U.S. Cl.
CPC ..................... *H02H 9/046* (2013.01)

(58) Field of Classification Search
CPC ................... H02H 9/04; H02H 9/046

USPC ..................................... 361/56, 91.1
See application file for complete search history.

(56) References Cited

U.S. PATENT DOCUMENTS

| | | | | |
|---|---|---|---|---|
| 8,050,003 B2* | 11/2011 | Kwak | ................ | H01L 27/0251 361/56 |
| 8,564,917 B2* | 10/2013 | Chen | ...................... | H02H 9/046 361/111 |
| 8,702,217 B2* | 4/2014 | Iftime | .................... | B82Y 30/00 347/100 |
| 9,030,791 B2* | 5/2015 | Prabhu | .................. | H02H 9/046 361/118 |
| 2003/0107856 A1* | 6/2003 | Huang | ................... | H02H 9/005 361/56 |
| 2007/0183104 A1* | 8/2007 | Tseng | ................. | H01L 27/0285 361/56 |
| 2012/0069478 A1* | 3/2012 | Caplan | ................ | H01L 27/0292 361/56 |
| 2012/0236447 A1* | 9/2012 | Mack | ..................... | H02H 9/046 361/56 |
| 2013/0163129 A1* | 6/2013 | Lai | ........................ | H02H 9/044 361/56 |
| 2013/0293991 A1* | 11/2013 | Chu | ....................... | H02H 9/046 361/56 |

* cited by examiner

*Primary Examiner* — Dharti Patel
(74) *Attorney, Agent, or Firm* — Williams Morgan, P.C.

(57) ABSTRACT

A circuit for electrostatic discharge (ESD) protection is disclosed. The circuit includes multiple transistors that are selectively turned on during an ESD event. An ESD sense circuit detects an ESD event and asserts signals to activate an ESD protection circuit which closes multiple protection transistors to dissipate current during the ESD event. During normal operation of the circuit, the signals are de-asserted, disabling the ESD protection circuit.

20 Claims, 6 Drawing Sheets

ENHANCED CHARGE DEVICE MODEL CLAMP

CROSS-REFERENCE TO RELATED APPLICATIONS

This application is a continuation of co-pending application Ser. No. 13/910,386, filed on Jun. 5, 2013.

FIELD OF THE INVENTION

The present invention relates generally to semiconductors and, more particularly, to a circuit for electrostatic discharge protection in semiconductors.

BACKGROUND

ESD (Electrostatic Discharge) protection design is a major factor in the reliability of deep-submicron CMOS Integrated Circuits (ICs). Since CMOS development technology is aggressive in the deep-submicron category, the device size and the thickness of the gate oxide are being continually reduced to improve the operating speed of the CMOS devices and integration density of the ICs. These highly scaled-down devices, however, have been found to be increasingly vulnerable to ESD. Therefore, ESD protection circuits have been added into the CMOS IC's to protect the IC's against ESD damage.

As a result of detailed investigations of ESD events on IC products, it is known that there are three main types of ESD events: Human-Body Model (HBM), Machine Model (MM), and Charge Device Model (CDM). These three ESD models have been well understood, and have been widely used as the industrial ESD testing standards.

A high potential may be generated on an input or output buffer of the integrated circuit. When the electrostatic charges are discharged, a high current is produced at the package nodes of the integrated circuit, and is referred to as electrostatic discharge (ESD).

Due to the continuing trend towards miniaturization of electronic devices, smaller critical dimensions and thinner dielectric layers are being used, which are more prone to damage from ESD events. It is therefore desirable to have improvements in the protection circuits used for preventing damage due to ESD.

SUMMARY OF THE INVENTION

A first aspect of the present invention provides an integrated circuit comprising: an input pin; an input stage circuit electrically connected to the input pin; an electrostatic discharge (ESD) sense circuit electrically connected to the input pin; and an input stage protection circuit electrically connected to the input pin and the ESD sense circuit, and configured and disposed to activate upon detection of an ESD event.

A second aspect of the present invention provides a semiconductor die comprising: a plurality of input pins, wherein each of the plurality of input pins is connected to a corresponding integrated circuit, the corresponding integrated circuit comprising: an electrostatic discharge (ESD) sense circuit electrically connected to each input pin; an input stage circuit electrically connected to the input pin; and an input stage protection circuit electrically connected to each input pin and the ESD sense circuit, and configured and disposed to activate upon detection of an ESD event.

A third aspect of the present invention provides a semiconductor device comprising: a plurality of semiconductor die disposed within a package, wherein each of the semiconductor die comprises: a plurality of input pins, wherein each of the plurality of input pins is connected to a corresponding integrated circuit, the corresponding integrated circuit comprising: an electrostatic discharge (ESD) sense circuit electrically connected to each input pin; an input stage circuit electrically connected to the input pin; and an input stage protection circuit electrically connected to each input pin and the ESD sense circuit, and configured and disposed to activate upon detection of an ESD event.

BRIEF DESCRIPTION OF THE DRAWINGS

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity. Furthermore, for clarity, some reference numbers may be omitted in certain drawings.

Features of this invention will be more readily understood from the following detailed description of the various aspects of the invention taken in conjunction with the accompanying drawings in which.

DETAILED DESCRIPTION

Exemplary embodiments will now be described more fully herein with reference to the accompanying drawings, in which exemplary embodiments are shown. Embodiments of the present invention provide a circuit for ESD protection. The circuit includes multiple transistors that are selectively turned on during an ESD event. An ESD sense circuit detects an ESD event and asserts signals to activate an ESD protection circuit which closes multiple protection transistors to dissipate current during the ESD event. During normal operation of the circuit, the signals are de-asserted, disabling the ESD protection circuit.

It will be appreciated that this disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. The terminology used herein is for the purpose of describing particular embodiments only and is not intended to be limiting of this disclosure. For example, as used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," "exemplary embodiments," or similar language means that a particular feature, structure, or characteristic described in connection with the embodiment is included in at least one embodiment of the present invention. Thus, appearances of the phrases "in one embodiment," "in an embodiment," "in embodiments" and similar language throughout this specification may, but do not necessarily, all refer to the same embodiment.

The terms "overlying" or "atop", "positioned on" or "positioned atop", "underlying", "beneath" or "below" mean that a first element, such as a first structure (e.g., a first layer), is present on a second element, such as a second structure (e.g. a second layer), wherein intervening elements, such as an interface structure (e.g. interface layer), may be present between the first element and the second element.

Figure 1:
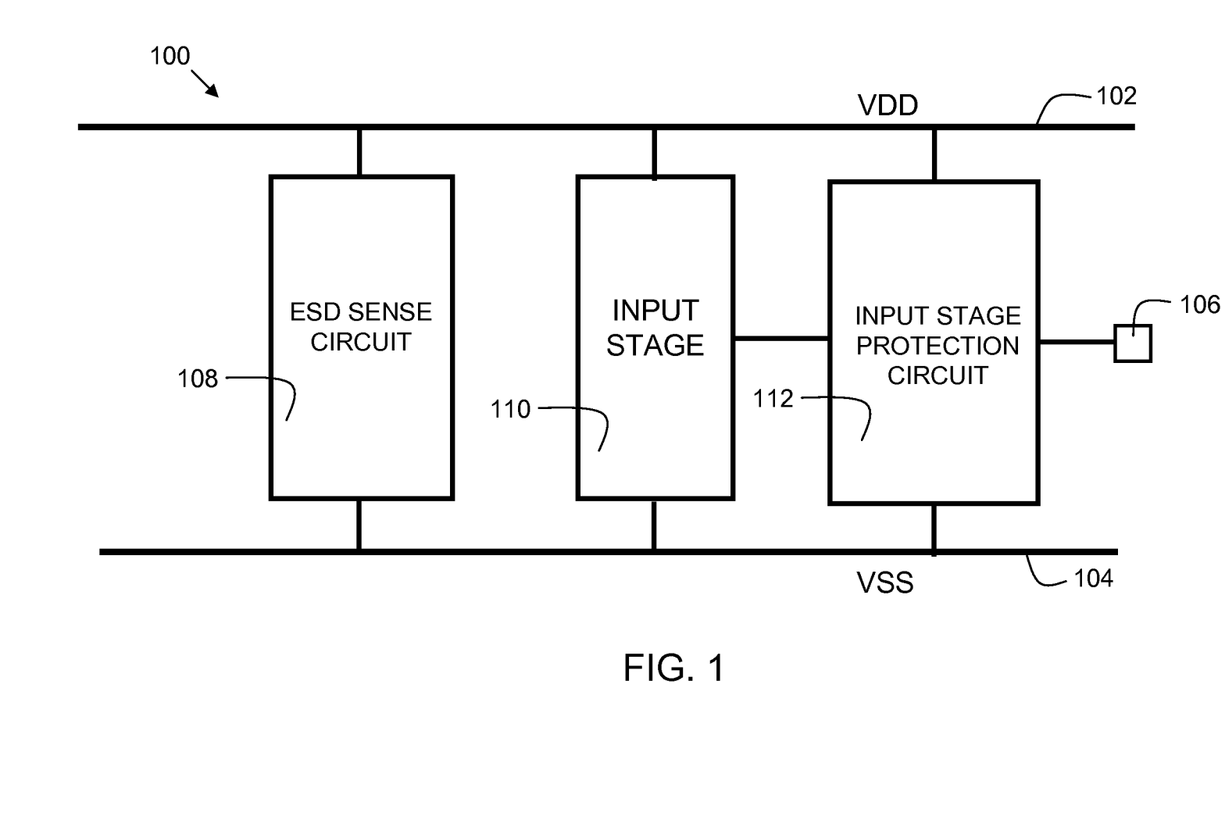
FIG. 1 is a block diagram of a circuit in accordance with illustrative embodiments.

FIG. 1 is a block diagram of a circuit 100 in accordance with illustrative embodiments. Circuit 100 comprises a first voltage source 102 (VDD), and a second voltage source 104 (VSS). In some embodiments, first voltage source 102 may range from about +1.0 volts to about +5.0 volts. In some embodiments, second voltage source 104 may range from ground (0 volts) to about −5 volts. Input pin 106 is electrically connected to an input stage 110. The input stage 110 may comprise multiple transistors used to amplify, and otherwise condition, an input signal on input pin 106. Circuit 100, including input pin 106, may reside on a chip or die that is part of a device where multiple die are "stacked" on one another inside a single package, or may be stacked on a silicon interposer substrate (e.g., 3D or 2.5D chips). Each die may include multiple input pins to align with output pins on a neighboring die, such that electrical signals may flow amongst the neighboring die. During the assembly of such devices, the die may be handled by various tools such as wafer handlers, bonders, and the like. Electrostatic charge that follows the charge device model (CDM) may be built up during the fabrication process, which can build up on an input pin and damage the input stage of a circuit. An ESD sense circuit 108 senses the onset of an ESD event and asserts various control signals to activate input stage protection circuit 112. The ESD sense circuit 108 may also provide some ESD protection. However, with the thinner oxides used on input stage transistors in modern devices, there is still opportunity for damage caused by ESD, hence the input stage protection circuit 112 is configured and disposed to activate upon detection of an ESD event, and is used to provide additional input stage protection in accordance with illustrative embodiments.

Figure 2:
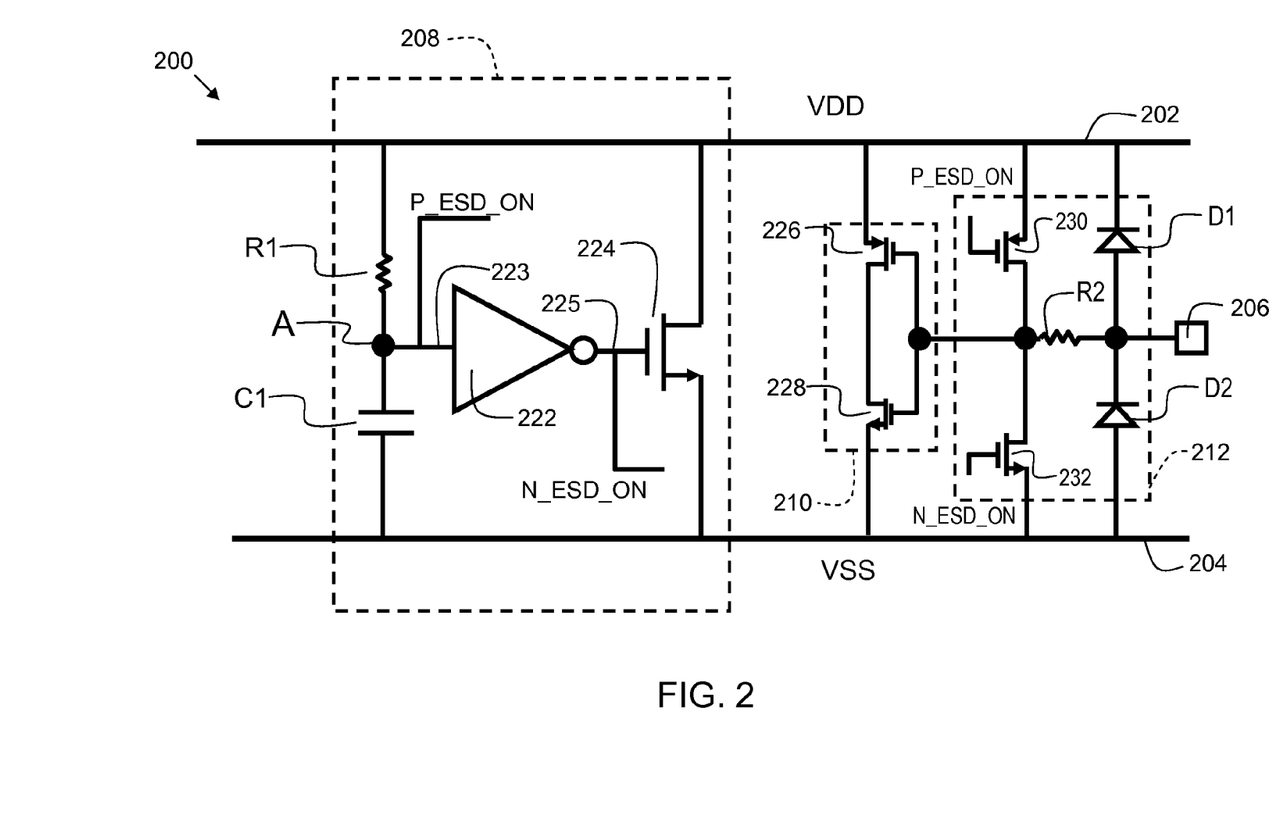
FIG. 2 is a schematic diagram of a circuit in accordance with illustrative embodiments.

FIG. 2 is a schematic diagram of a circuit 200 in accordance with illustrative embodiments that indicates internal components of the block diagram modules introduced in FIG. 1. Circuit 200 comprises input pin 206, which is electrically connected to input stage 210. Input stage 210 may include multiple transistors, such as transistor 226 and transistor 228. ESD sense circuit 208 comprises resistor R1 in series with capacitor C1, where R1 is connected to first voltage source 202 (VDD) and C1 is connected to second voltage source 204 (VSS). Node A is at a resistor-capacitor (RC) connection point in between R1 and C1. Node A serves as a source for positive ESD sense signal P_ESD_ON, which is an active-low signal. Signal P_ESD_ON originates from the RC connection point at node A, and is connected to the input 223 of inverter 222. An N_ESD_ON signal originates from the output 225 of inverter 222. Signal N_ESD_ON is an active-high signal. Input stage protection circuit 212 includes a first protection transistor 230 and a second protection transistor 232. Transistor 230 is a transistor that acts as a closed switch when a low signal is applied to its gate. Transistor 232 is a transistor that acts as a closed switch when a high signal is applied to its gate. Transistor 230 and transistor 232 are metal oxide semiconductor field effect transistors (MOSFETs), but may behave as a parasitic bipolar junction transistor (BJT) under certain conditions. Transistor 230 and transistor 232 are configured in series in a source-drain configuration, where the drain of transistor 230 is connected to first voltage source 202, and where the source of transistor 230 is connected to the drain of transistor 232, and where the source of transistor 232 is connected to the second voltage source 204. The P_ESD_ON signal is connected to the gate of transistor 230, and the N_ESD_ON signal is connected to the gate of transistor 232. An input resistor R2 may be connected between input pin 206 and the input stage 210. A diode D1 is connected between the input pin 206 and the first voltage source 202. A diode D2 is connected between the input pin 206 and the second voltage source 204.

In some embodiments, the resistance value for R1 may range from about 400 kilo-ohms (kOhms) to about 600 kOhms, and in some embodiments, has a resistance value of about 500 kOhms. In some embodiments, the capacitance value for the capacitor C1 may range from about 1 microfarad to about 5 microfarads. The values for R1 and C1 may be selected such that the RC time constant is about 1 microsecond. In some embodiments, the resistance value for R2 may range from about 50 ohms to about 100 ohms.

Figure 3:
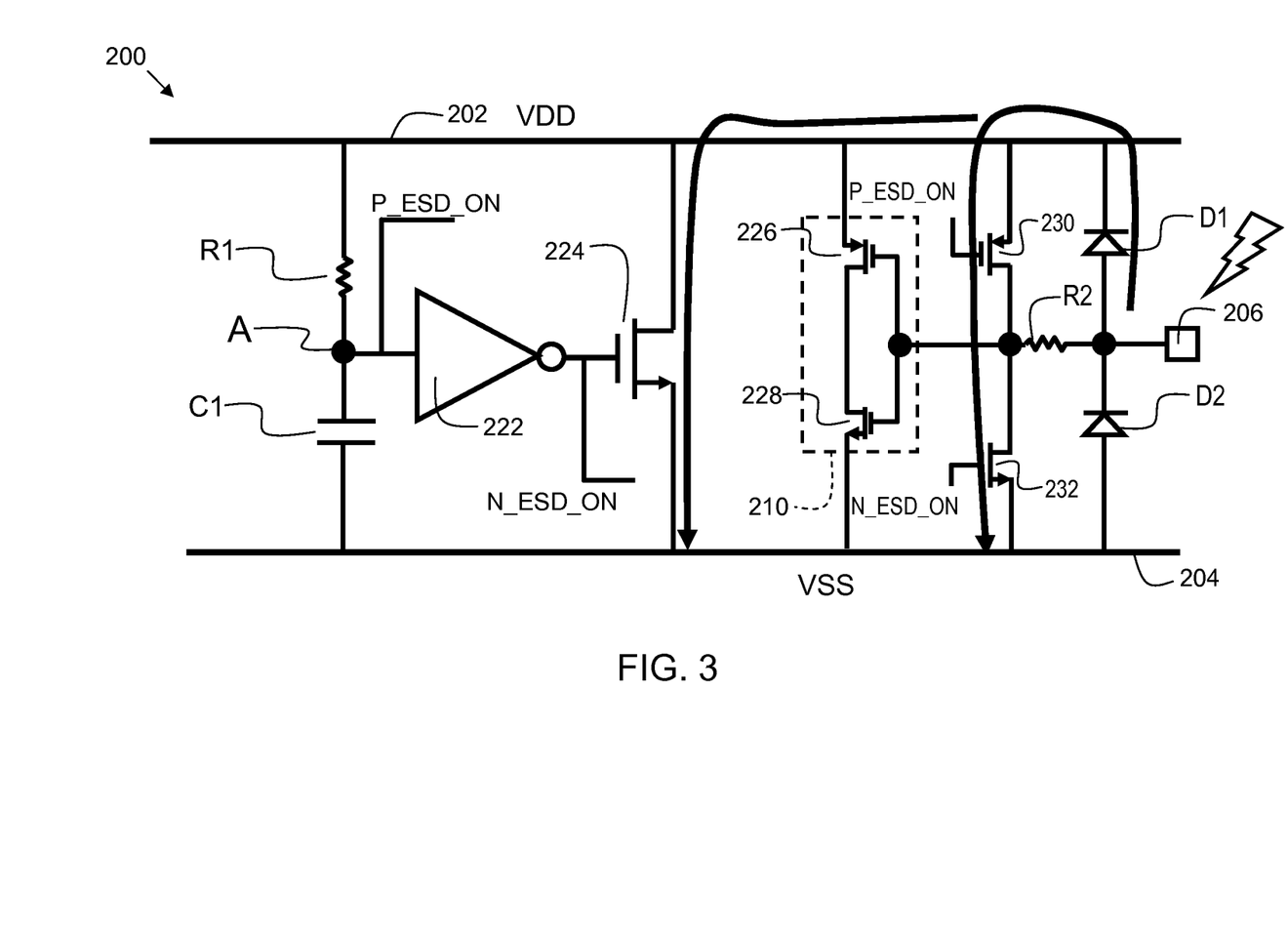
FIG. 3 is a schematic diagram of a circuit indicating current flow during a positive ESD event.

FIG. 3 is a schematic diagram of circuit 200 indicating current flow during a positive ESD event. When a positive ESD event occurs on input pin 206, positive voltage builds up on the pin 206 faster than it can build up at node A, because it takes a finite time for voltage to build up across capacitor C1. During ESD encountered during the manufacturing process, there is no power supply voltage, but the ESD energy charges the first voltage source 202 (VDD) to a voltage of Vpin-$V_{D1}$, where Vpin is the voltage of pin 206, and $V_{D1}$ represents the voltage drop across diode D1. Hence, P_ESD_ON is asserted (active-low), and at the output of inverter 222, N_ESD_ON is asserted (active-high). Signal N_ESD_ON is input to the gate of transistor 224, which makes transistor 224 as a closed switch, dissipating some of the ESD-induced current. Additionally, the asserted P_ESD_ON signal makes transistor 230 as a closed switch and the asserted N_ESD_ON signal makes transistor 232 as a closed switch, to dissipate additional ESD-induced current, thus limiting the voltage buildup at the gates of transistors 226 and 228 of the input stage 210 resulting from an ESD event that occurs during the manufacturing process.

Figure 4:
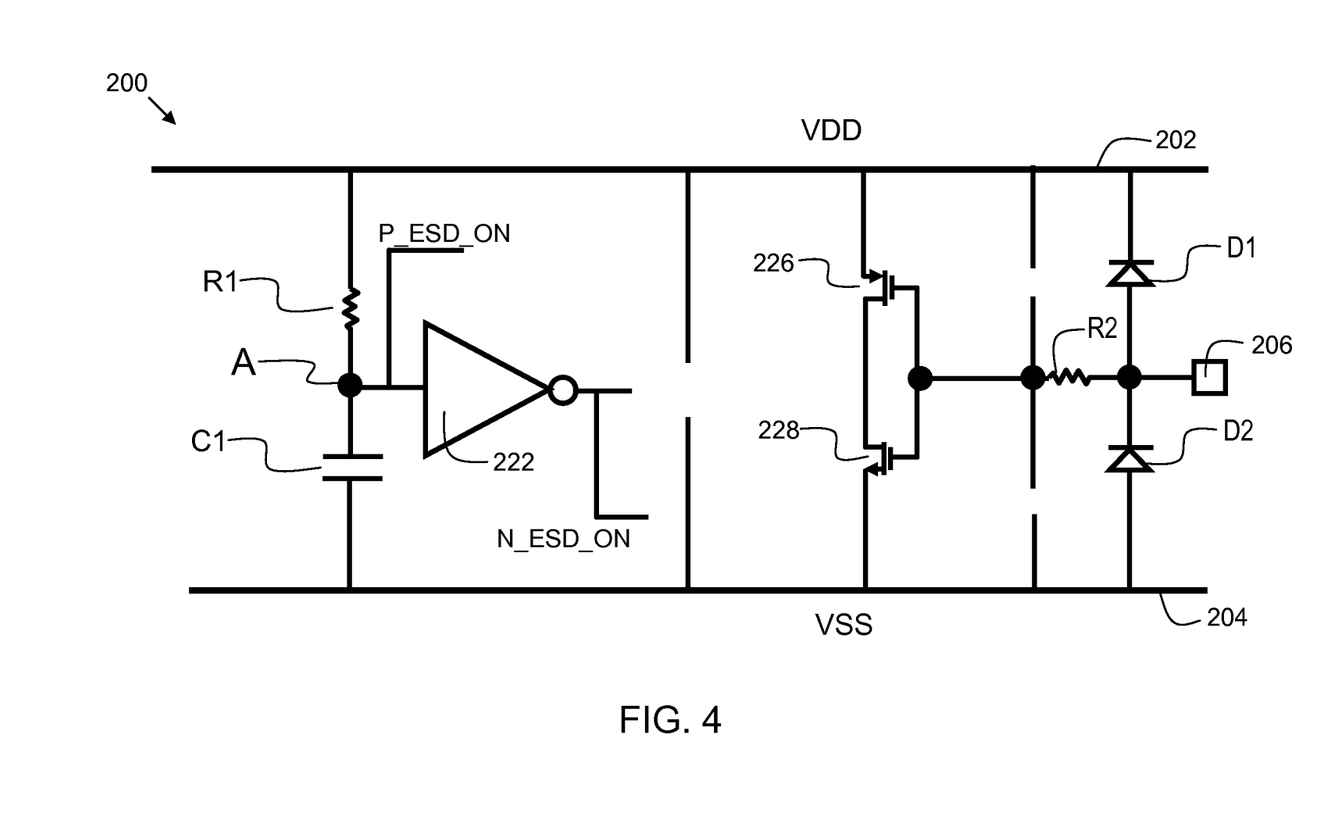
FIG. 4 is a schematic diagram indicating the effective ESD circuit during normal operation.

FIG. 4 is a schematic diagram of circuit 200 indicating the effective circuit during normal operation. As power is applied during normal operation, first voltage source 202 (VDD) is energized, and after a brief time (e.g. on the order of one microsecond) the voltage builds up on capacitor C1 such that the voltage at node A is in a logical high state, causing signals P_ESD_ON and N_ESD_ON to be de-asserted. This causes transistors 224, 230, and 232 (see FIG. 2) to behave as open circuits, as illustrated in FIG. 4. Hence, the input stage protection circuit 212 (FIG. 2) is effectively disabled during normal operation.

Figure 5:
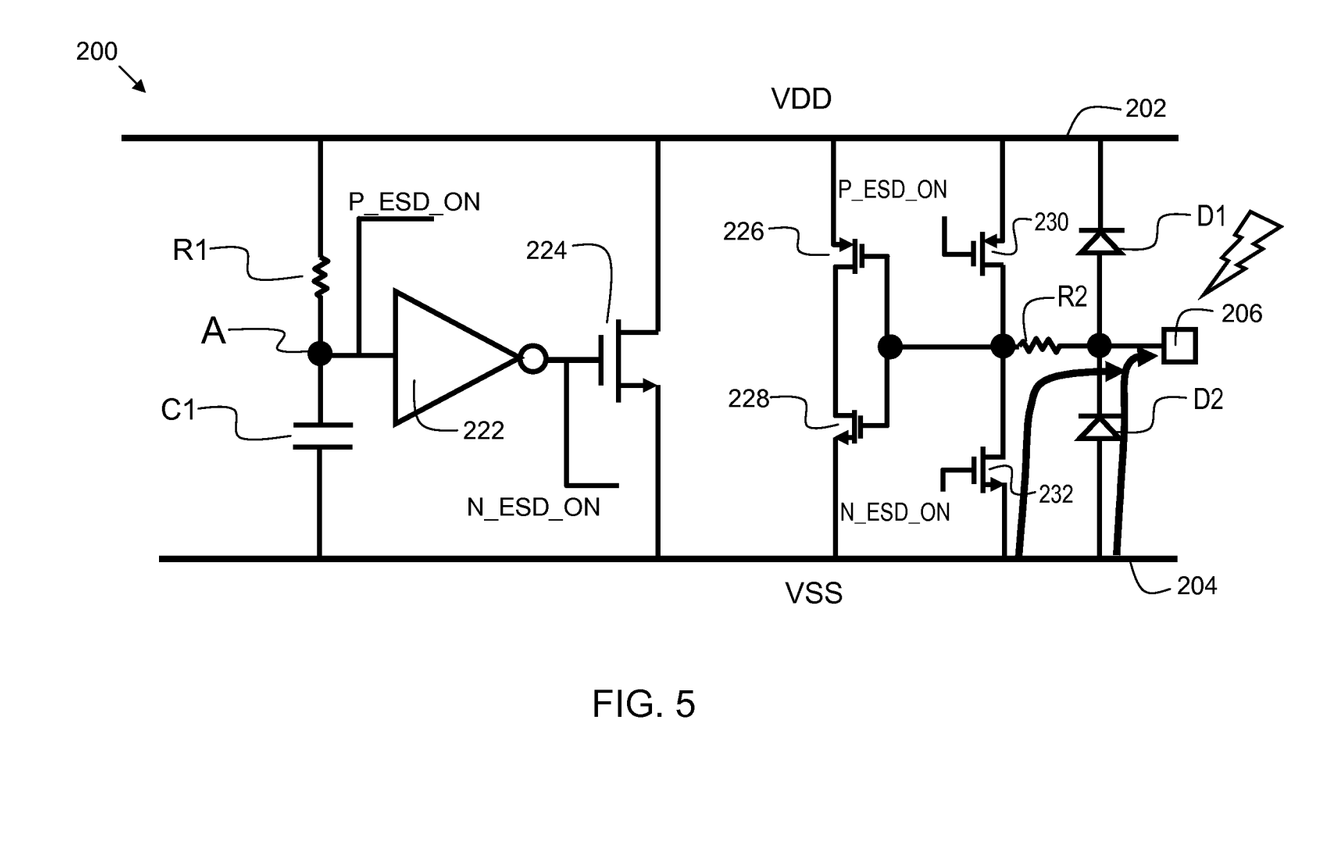
FIG. 5 is a schematic diagram of a circuit indicating current flow during a negative ESD event.

FIG. 5 is a schematic diagram of circuit 200 indicating current flow during a negative ESD event. A majority of the current is dissipated through diode D2. Additional current is dissipated through transistor 232, which behaves as a parasitic diode in this case.

Figure 6:
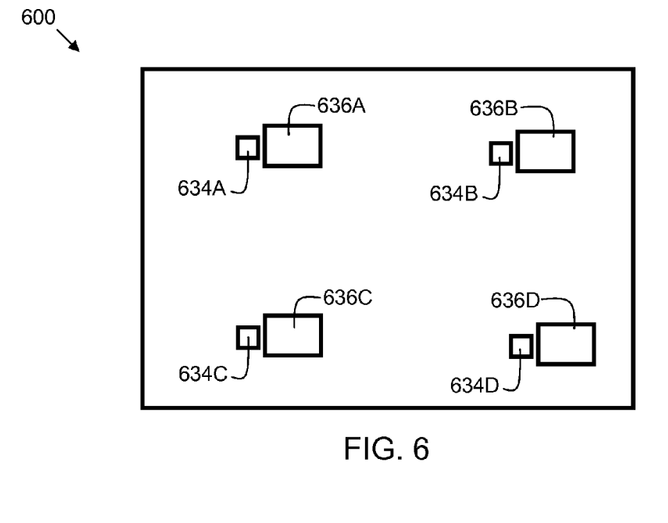
FIG. 6 is a block diagram of a die including multiple ESD protection circuits in accordance with illustrative embodiments.

FIG. 6 is a block diagram of a die 600 including multiple input pins (634A-634D) and corresponding integrated circuits (636A-636D) in accordance with illustrative embodiments. Each input pin (634A-634D) may be similar to pin 206 of FIG. 2. Each corresponding integrated circuit (636A-636D) may be similar to circuit 200 of FIG. 2. Note that while only four such input pins and corresponding integrated circuits (each include an ESD protection circuit) are illustrated, embodiments may have many more input pins and corresponding integrated circuits.

Figure 7:
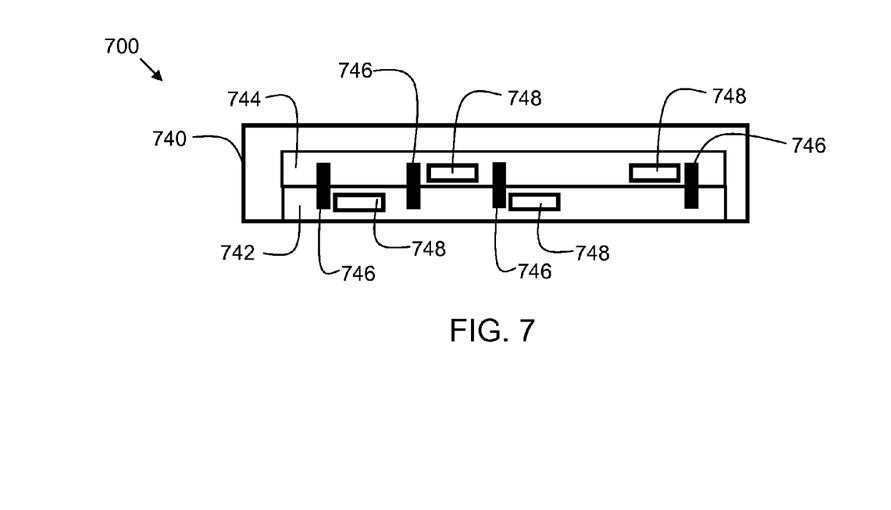
FIG. 7 is a block diagram of a package including multiple die having ESD protection circuits in accordance with illustrative embodiments.

FIG. 7 is a block diagram of a device 700 including a package 740 which encloses die 742 and die 744, each having ESD protection circuits in accordance with illustrative embodiments. The input pins are shown generally as 746, and the corresponding integrated circuits (each including an ESD protection circuit) are shown generally as 748. Each input pin 746 may be similar to pin 206 of FIG. 2. Each corresponding integrated circuit 748 may be similar to circuit 200 of FIG. 2. Note that while only four such input pins and corresponding integrated circuits are illustrated, embodiments may have many more input pins and corresponding integrated circuits.

In various embodiments, design tools can be provided and configured to create the datasets used to pattern the semiconductor layers as described herein. For example, data sets can be created to generate photomasks used during lithography operations to pattern the layers for structures as described herein. Such design tools can include a collection of one or more modules and can also include hardware, software, or a combination thereof. Thus, for example, a tool can be a collection of one or more software modules, hardware modules, software/hardware modules, or any combination or permutation thereof. As another example, a tool can be a computing device or other appliance on which software runs or in which hardware is implemented. As used herein, a module might be implemented utilizing any form of hardware, software, or a combination thereof. For example, one or more processors, controllers, application-specific integrated circuits (ASIC), programmable logic arrays (PLA)s, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

While the invention has been particularly shown and described in conjunction with exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the formation and/or processing of structures illustrated and described herein as well as in association with other structures not illustrated. Therefore, it is to be understood that the appended claims are intended to cover all such modifications and changes that fall within the true spirit of the invention.

What is claimed is:

1. A system comprising:
   an input pin;
   an input stage circuit electrically connected to the input pin;
   an electrostatic discharge (ESD) sense circuit having a plurality of output signals; and
   an input stage protection circuit electrically connected to the input pin and the plurality of output signals of the ESD sense circuit, and configured and disposed to activate upon detection of an ESD event.

2. The system of claim 1, wherein the ESD sense circuit comprises:
   a resistor connected to a VDD voltage;
   a capacitor connected to a VSS voltage, wherein the resistor and capacitor are connected in series, forming an RC connection point; and
   an inverter circuit having an inverter input and an inverter output, the inverter circuit connected to the VDD voltage and the VSS voltage, wherein a P_ESD_ON signal originates from the RC connection point and is connected to the inverter input; wherein an $N_{13}\_ESD_{13}\_ON$ signal originates from the inverter output, and wherein the $P\_ESD_{13}\_ON$ signal and the $N_{13}\_ESD_{13}\_ON$ signal comprise the plurality of output signals.

3. The system of claim 2, wherein the resistor comprises a resistance value ranging from about 400 kilo-ohms to about 600 kilo-ohms and the capacitor comprises a capacitance value ranging from about 1 microfarad to about 5 microfarads.

4. The system of claim 2, wherein the ESD sense circuit further comprises a transistor, the transistor comprising a gate, source, and drain, and wherein the $N_{13}\_ESD_{13}\_ON$ signal is connected to the gate.

5. The system of claim 2, further comprising an input resistor disposed between the input pin and the input stage protection circuit.

6. The system of claim 5, wherein the input resistor comprises a resistance value ranging from about 50 ohms to about 100 ohms.

7. The system of claim 5, further comprising a first diode connected between the input pin and the VDD voltage and a second diode connected between the input pin and the VSS voltage.

8. The system of claim 2, wherein the input stage protection circuit comprises a first protection transistor connected to the VDD voltage, and a second protection transistor connected to the VSS voltage, wherein the first protection transistor and second transistor are connected in series in a source-drain configuration.

9. The system of claim 8, wherein the $P_{13}$ $ESD_{13}$ ON signal is connected to a gate of the first protection transistor, and wherein the $N_{13}$ $ESD_{13}$ ON signal is connected to a gate of the second protection transistor.

10. The system of any one of claims 1, 2, or 7, wherein the system is an integrated circuit and the input pin is a pad.

11. A semiconductor die comprising:
 a plurality of input pads, wherein each of the plurality of input pads is connected to a corresponding integrated circuit, the corresponding integrated circuit comprising:
 an electrostatic discharge (ESD) sense circuit having a plurality of output signals;
 an input stage circuit electrically connected to the input pad; and
 an input stage protection circuit electrically connected to each input pad and the plurality of output signals of the ESD sense circuit, and configured and disposed to activate upon detection of an ESD event.

12. The semiconductor die of claim 11, wherein each ESD sense circuit comprises:
 a resistor connected to a VDD voltage;
 a capacitor connected to a VSS voltage, wherein the resistor and capacitor are connected in series, forming an RC connection point; and
 an inverter circuit having an inverter input and an inverter output, the inverter circuit connected to the VDD voltage and the VSS voltage; wherein a $P_{13}$ $ESD_{13}$ ON signal originates from the RC connection point and is connected to the inverter input; wherein an $N_{13}$ $ESD_{13}$ ON signal originates from the inverter output, and wherein the $P_{13}$ $ESD_{13}$ ON signal and the $N_{13}$ $ESD_{13}$ ON signal comprise the plurality of output signals.

13. The semiconductor die of claim 12, wherein each ESD sense circuit further comprises a transistor, the transistor comprising a gate, source, and drain, and wherein the $N_{13}$ $ESD_{13}$ ON signal is connected to the gate.

14. The semiconductor die of claim 13, wherein each corresponding integrated circuit further comprises a first diode connected between the input pad and the VDD voltage.

15. The semiconductor die of claim 14, wherein each corresponding integrated circuit further comprises a second diode connected between the input pad and the VSS voltage.

16. The semiconductor die of claim 15, wherein each input stage protection circuit comprises a first protection transistor connected to the VDD voltage, and a second protection transistor connected to the VSS voltage, wherein the first protection transistor and second transistor are connected in series in a source-drain configuration.

17. The semiconductor die of claim 16, wherein each corresponding integrated circuit further comprises the $P_{13}$ $ESD_{13}$ ON signal connected to a gate of the first protection transistor, and the $N_{13}$ $ESD_{13}$ ON signal connected to a gate of the second protection transistor.

18. A semiconductor device comprising:
 a plurality of semiconductor die disposed within a package, wherein: each of the semiconductor die comprises:
 a plurality of input pads, wherein each of the plurality of input pads is connected to a corresponding integrated circuit, the corresponding integrated circuit comprising:
 an electrostatic discharge (ESD) sense circuit having a plurality of output signals;
 an input stage circuit electrically connected to the input pad; and
 an input stage protection circuit electrically connected to each input pad and the plurality of output signals of the ESD sense circuit, and configured and disposed to activate upon detection of an ESD event.

19. The semiconductor device of claim 18, wherein each ESD sense circuit comprises:
 a resistor connected to a VDD voltage;
 a capacitor connected to a VSS voltage, wherein the resistor and capacitor are connected in series, forming an RC connection point;
 an inverter circuit having an inverter input and an inverter output, the inverter circuit connected to the VDD voltage and the VSS voltage, wherein a $P_{13}$ $ESD_{13}$ ON signal originates from the RC connection point and is connected to the inverter input, wherein an $N_{13}$ $ESD_{13}$ ON signal originates from the inverter output, and wherein the $P_{13}$ $ESD_{13}$ ON signal and the $N_{13}$ $ESD_{13}$ ON signal comprise the plurality of output signals.

20. The semiconductor device of claim 19, wherein each input stage protection circuit comprises: a first protection transistor connected to the VDD voltage, and a second protection transistor connected to the VSS voltage, wherein the first protection transistor and second transistor are connected in series in a source-drain configuration; and wherein the $P_{13}$ $ESD_{13}$ ON signal is connected to a gate of the first protection transistor, and the $N_{13}$ $ESD_{13}$ ON signal is connected to a gate of the second protection transistor.

* * * * *